UNITED STATES PATENT OFFICE.

HERMANN SCHIERLOH, OF JERSEY CITY, NEW JERSEY, ASSIGNOR TO SCHIERLOH MANUFACTURING COMPANY, OF SAME PLACE.

IMPROVEMENT IN THE MANUFACTURE OF STEEL.

Specification forming part of Letters Patent No. 188,820, dated March 27, 1877; application filed July 13, 1876.

*To all whom it may concern:*

Be it known that I, HERMANN SCHIERLOH, of Jersey City, New Jersey, have invented a certain Improvement in the Manufacture of Steel, of which the following is a specification:

The object of my invention is to convert Bessemer steel into a steel of increased tensile strength, which is capable of being welded upon itself without the interposition between the welding-surfaces of any foreign material.

It has been heretofore known that Bessemer steel could be welded at a comparatively low heat by the use of iron and borax, and Letters Patent of the United States, No. 147,576, for a welding compound of powdered iron and calcined borax, were issued to me February 17, 1874. I have discovered, however, that Bessemer steel, when welded by the use of my welding compound, and otherwise treated in the manner hereinafter set forth, acquires new qualities and properties. In quality its tensile strength is greatly increased, and it has the new property of being weldable upon itself without further use of any welding compound; and my invention consists in the mode of treatment of Bessemer steel which I now proceed to describe.

The first step in my process is to form Bessemer steel by hammering or rolling into flat bars, preferably, not exceeding three-quarters of an inch in thickness, and, say, four inches in width. These pieces or billets, as it is convenient to call them, are then cut into suitable lengths for piling. The next step is to evenly coat the surfaces of the billets with a mixture of about equal proportions of powdered iron and calcined borax. A convenient way of effecting the uniform distribution of the proper quantity of iron and calcined borax is to wet the billets in water, and then pour or sprinkle the powdered iron and calcined borax upon the wetted surfaces. The billets, having been thus made to acquire a thin and even coating of powdered iron and calcined borax, are piled in the usual manner in a furnace, and after having been heated to a bright cherry-red are removed from the furnace and subjected to moderate pressure or hammering. By this means the billets are welded into a solid mass. The pile of billets thus welded is then returned into the furnace and reheated until hot enough to roll. The piles being then removed from the furnace are rolled or hammered into plates, rods, bars, or any other forms required.

It will be found that the product from Bessemer steel thus treated is remarkably tough and malleable, and is weldable both to itself and to wrought-iron and other steel. It may be bent, twisted, or punctured while cold without injury to its fiber. Experiment has shown that its tensile strength is upward of one hundred and forty-six thousand pounds to the square inch, and that when rolled into No. 4 rods it may be drawn down cold to No. 14 wire-gage without annealing.

I claim as my invention—

The process of converting Bessemer steel into weldable steel, herein described, which consists in applying to the surfaces of Bessemer-steel billets an even coating of powdered iron and calcined borax, then in piling them in the usual way, and after heating the piles to a cherry-red, subjecting them to pressure by rolling or hammering, thereby welding the billets into a solid mass, and finally, after reheating the piles or welded billets, hammering or rolling them down into any desired forms.

In testimony that I claim the foregoing as my own I affix my signature in presence of two witnesses.

HERMANN SCHIERLOH.

Witnesses:
THOMAS C. CONNOLLY,
C. L. BUCKINGHAM.